United States Patent [19]

Shimizu et al.

[11] Patent Number: 5,303,548
[45] Date of Patent: Apr. 19, 1994

[54] DEVICE FOR DETERMINING DETERIORATION OF A CATALYTIC CONVERTER FOR AN ENGINE

[75] Inventors: Yasuhiro Shimizu, Nishikamo; Nobuyuki Kobayashi, Toyota, both of Japan

[73] Assignee: Toyota Jidosha Kabushiki Kaisha, Aichi, Japan

[21] Appl. No.: 957,037

[22] Filed: Oct. 6, 1992

[30] Foreign Application Priority Data

Oct. 11, 1991 [JP] Japan ................................. 3-263859

[51] Int. Cl.$^5$ ............................................. F02B 19/00
[52] U.S. Cl. ......................................... 60/277; 60/274; 60/276; 60/285
[58] Field of Search .................. 60/274, 276, 277, 285

[56] References Cited

U.S. PATENT DOCUMENTS

| Re. 33,942 | 6/1992 | Katsuno et al. | 60/274 |
| 4,739,614 | 4/1988 | Katsuno et al. | 60/274 |
| 5,088,281 | 2/1992 | Izutani et al. | 60/274 |
| 5,119,628 | 6/1992 | Uema et al. | 60/277 |

FOREIGN PATENT DOCUMENTS

| 3443649 | 6/1986 | Fed. Rep. of Germany . |
| 3841685 | 6/1990 | Fed. Rep. of Germany . |
| 3916467 | 11/1990 | Fed. Rep. of Germany . |
| 60-231155 | 11/1985 | Japan . |
| 61-185634 | 8/1986 | Japan . |
| 62-29711 | 2/1987 | Japan . |
| 63-97852 | 4/1988 | Japan . |
| 63-147941 | 6/1988 | Japan . |
| 2-30915 | 2/1990 | Japan . |
| 2-33408 | 2/1990 | Japan . |
| 2-91440 | 3/1990 | Japan . |
| 2-207159 | 8/1990 | Japan . |
| 3-57862 | 3/1991 | Japan . |
| 3-134241 | 6/1991 | Japan . |
| 3-286160 | 12/1991 | Japan . |
| 2225860 | 6/1990 | United Kingdom . |

OTHER PUBLICATIONS

John W. Koupal et al, "Detection of Catalyst Failure On-Vehicle Using the Dual Oxygen Sensor Method," Jul. 31, 1991, pp. 135–146. (SAE Technical Paper Series 910561).

William B. Clemens, et al, "Detection of Catalyst Performance Loss Using On-Board Diagnostics," Feb. 26–Mar. 2, 1990, pp. 1–18; International Congress and Exposition—Detroit, Michigan. (SAE Technical Paper Series 900062).

*Primary Examiner*—Noah P. Kamen
*Attorney, Agent, or Firm*—Oliff & Berridge

[57] ABSTRACT

A device for determining deterioration of a catalytic converter for an engine equipped with a catalytic converter disposed in the exhaust passage and upstream and downstream air-fuel ratio sensors disposed in the exhaust passage upstream and downstream of the catalytic converter, respectively, wherein the device calculates the area surrounded by the output response curve of the downstream air-fuel ratio sensor and a predetermined reference value line, the device determining whether or not the catalyst is deteriorated in accordance with the area calculated when the output of downstream air-fuel ratio sensor stays on a rich side or lean side air-fuel ratio for more than a predetermined time during feedback control of air-fuel ratio by the output of upstream air-fuel ratio sensor.

18 Claims, 14 Drawing Sheets

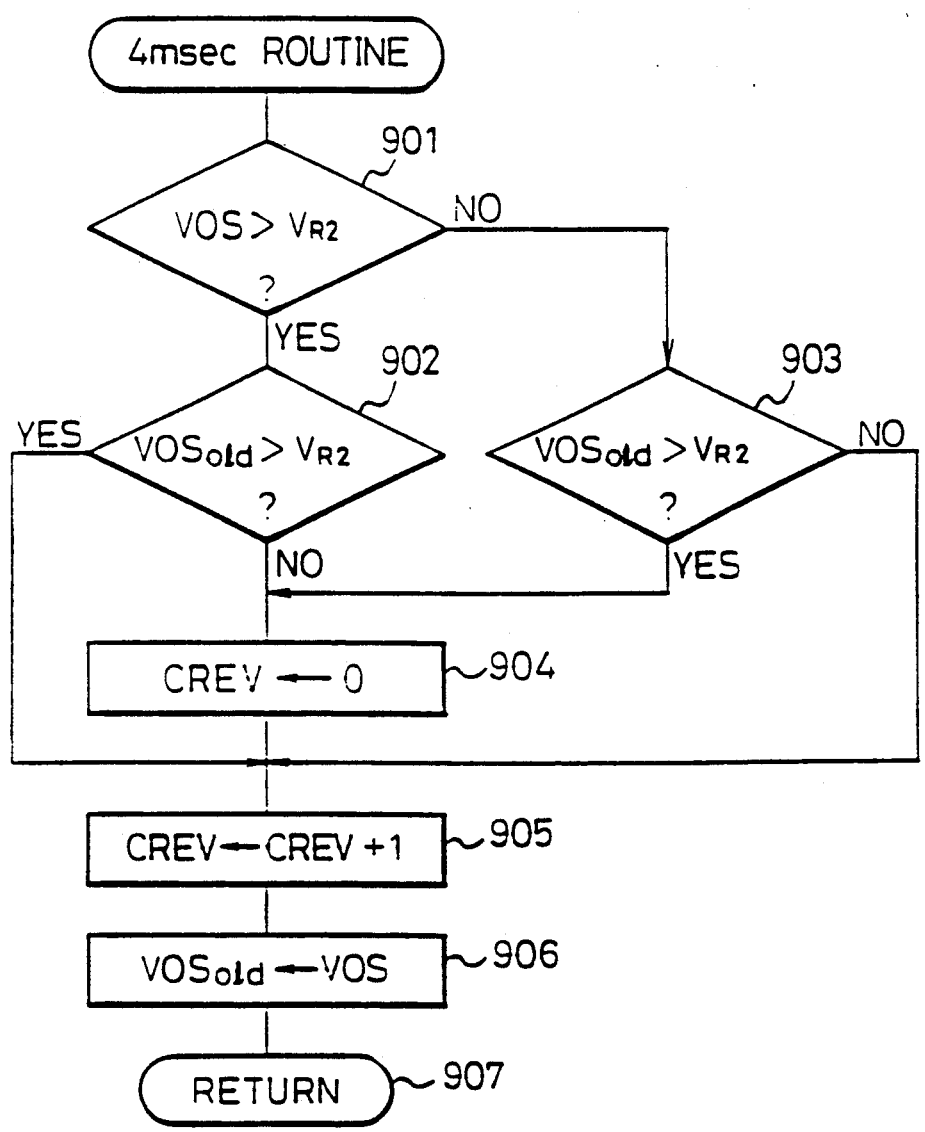

DEVICE FOR DETERMINING DETERIORATION OF A CATALYTIC CONVERTER FOR AN ENGINE

BACKGROUND OF THE INVENTION

1. Field of the Invention

The present invention relates to an air-fuel ratio control device for an engine which controls an air-fuel ratio of the engine based on at least an output of an air-fuel ratio sensor disposed in the exhaust passage upstream of a three-way catalyst. More specifically, the present invention relates to an air-fuel ratio control device that is able to detect deterioration of the three-way catalyst based on at least an output of an air-fuel ratio sensor disposed in the exhaust passage downstream of the three-way catalyst.

2. Description of the Related Art

An air-fuel ratio control device for controlling an air-fuel ratio of an engine by feedback control based on an output of an air-fuel ratio sensor ($O_2$ sensor) disposed in an exhaust passage upstream of a catalytic converter is known as a single $O_2$ sensor system. The single $O_2$ sensor system is used for controlling the air-fuel ratio of the engine to a stoichiometric air-fuel ratio to improve the condition of the exhaust emissions by utilizing the ability of the three-way catalytic converter to a maximum degree.

To compensate for individual differences among cylinders or changes due to aging of the upstream $O_2$ sensor, a double $O_2$ sensor system using two $O_2$ sensors has been developed (U.S. Pat. No. 4,739,614). In the double $O_2$ sensor system, $O_2$ sensors are disposed upstream and downstream of the catalytic converter in the exhaust passage, and the air-fuel ratio control is carried out based on the output of the downstream $O_2$ sensor as well as the output of the upstream $O_2$ sensor.

Nevertheless, even in the double $O_2$ sensor system, if the catalyst in the catalytic converter is deteriorated, the condition of the exhaust emissions, such as HC, CO, and $NO_x$, is worsened, therefore it is necessary to detect the deterioration of the catalyst accurately.

To detect the deterioration of the catalyst in the catalytic converter, various methods or devices have been proposed.

For example, in U.S. Pat. No. 4,739,614, a method for detecting the deterioration based on the interval of reversals of the output of the downstream $O_2$ sensor during air-fuel ratio feedback control (i.e., the period of changes of the output signal from a rich side air-fuel ratio to a lean side air-fuel or vice-versa) is disclosed.

When the catalyst has deteriorated, the interval of reversals of the output of the downstream $O_2$ sensor during the air-fuel ratio feedback control becomes shorter and the amplitude of the output of the downstream $O_2$ sensor becomes larger. The method disclosed in U.S. Pat. No. 4,739,614 utilizes this phenomenon to detect the deterioration of the catalyst and determines that the catalyst has deteriorated when the ratio of the period $T_1$ of the reversal of the output of the upstream $O_2$ sensor to the period $T_2$ of the reversal of the output of the downstream $O_2$ sensor, i.e., $T_1/T_2$, becomes larger than a predetermined value (or, alternatively, when the amplitude of the output of the downstream $O_2$ sensor becomes larger than a predetermined value). However, in the above system, if the central center value of the air-fuel ratio controlled by the air-fuel feedback control deviates largely from the stoichiometric air-fuel ratio, reversal of the output of the downstream $O_2$ sensor does not occur. In this case, the output of the downstream $O_2$ sensor oscillates at a small amplitude at a rich side or lean side of the air-fuel ratio.

Also, in some cases, the amplitude of the output of the downstream $O_2$ sensor may become large even if the catalyst is not deteriorated (e.g., when the operating condition of the engine changes suddenly, the amplitude of the output of the downstream $O_2$ sensor can becomes large momentarily).

Therefore, it is sometimes difficult to detect the deterioration of the catalyst accurately based on the period of reversal or the amplitudes of the output of the $O_2$ sensors.

SUMMARY OF THE INVENTION

In view of the problems of the related art, the object of the present invention is to provide a device for determining a deterioration of a catalytic converter which can detect the deterioration of the catalytic converter used in the double $O_2$ sensor system accurately even if the central value of the air-fuel ratio feedback control deviates largely from the stoichiometric air-fuel ratio.

According to the present invention, there is provided a device for determining deterioration of a three-way catalyst disposed in an exhaust passage of an internal combustion engine equipped with an upstream air-fuel ratio sensor disposed in the exhaust passage upstream of the three-way catalyst, a downstream air-fuel ratio sensor disposed in the exhaust passage downstream of the three-way catalyst, and a feedback control means for controlling the air-fuel ratio of the engine by feedback control based on at least the output of the upstream air-fuel ratio sensor.

According to one aspect of the present invention, the device comprises a signal condition detecting means for detecting the condition where the output signal of the downstream air-fuel ratio sensor is maintained at either a rich side air-fuel ratio or a lean side air-fuel ratio for more than a predetermined time during the feedback control of the engine by the feedback control means, a means for calculating an area surrounded by the output signal response curve of the downstream air-fuel ratio sensor and a predetermined reference value line, and a determining means for determining whether or not the three-way catalyst has deteriorated in accordance with the calculated area when the signal condition detecting means detects that the output signal of the downstream air-fuel ratio sensor is maintained at either the rich side air-fuel ratio or the lean side air-fuel ratio for more than the predetermined time.

According to another aspect of the present invention, the device comprises a means for calculating an area surrounded by the output signal response curve of the downstream air-fuel ratio sensor and a first predetermined reference value line, a means for calculating an area surrounded by the output signal response curve of said upstream air-fuel ratio sensor and a second predetermined reference value line, a means for calculating a ratio of said area of the downstream air-fuel ratio sensor and said area of the upstream air-fuel ratio sensor, and a determining means for determining whether or not said three-way catalyst is deteriorated in accordance with said ratio of the areas. In this case, the determination of the catalyst deterioration may be carried out when the output signal of the downstream air-fuel ratio sensor is not maintained at either a rich side air-fuel ratio or a lean side air-fuel ratio during the feedback control.

BRIEF DESCRIPTION OF THE DRAWINGS

The present invention will be better understood from the description as set forth hereinafter, with reference to the accompanying drawings, in which:

FIGS. 4A, 4B, 6A, 6B, 7, 8A through 8D, 9, and 10 are flow charts showing the operations of the control circuit in FIG. 3.

DESCRIPTION OF THE PREFERRED EMBODIMENTS

FIGS. 1 and 2 schematically illustrate the principle of the method for detecting deterioration of a three-way catalyst according to an embodiment of the present invention.

As explained later in detail, the deterioration of the catalyst is detected based on the area surrounded by the output response curve of the downstream $O_2$ sensor and a predetermined reference value line.

Figure 2A:
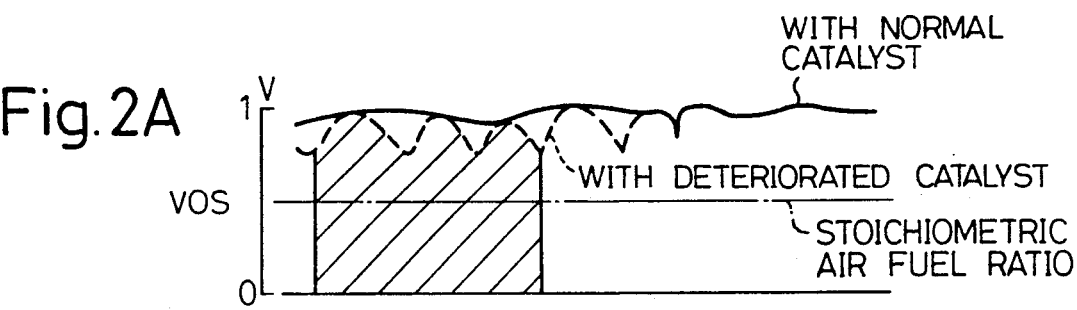
Figure 2B:
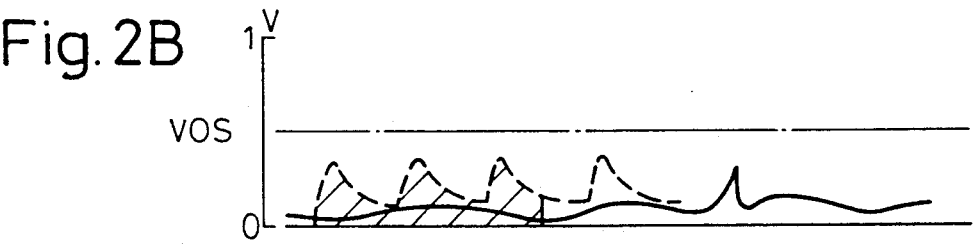
Figure 2C:
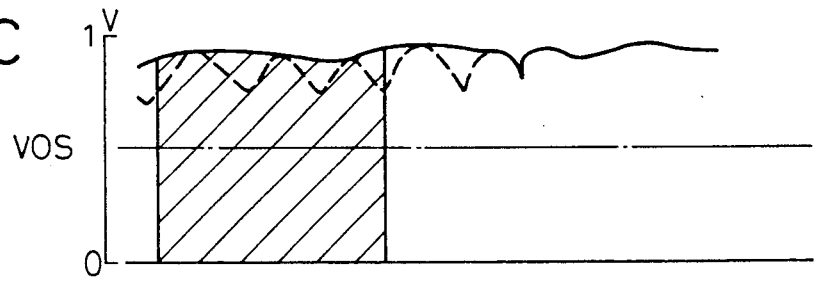
Figure 2D:
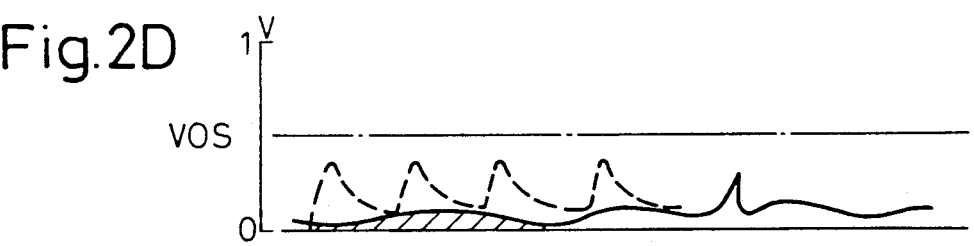
Figure 2E:
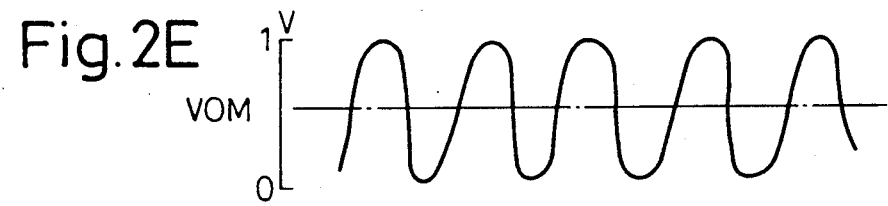

FIG. 2(E) shows the response curve of the output VOM of the upstream $O_2$ sensor when the engine air-fuel ratio is feedback controlled based on the output VOM of the upstream $O_2$ sensor. As seen from FIG. 2(E), the output VOM of the upstream $O_2$ sensor oscillates regularly between the lean side and rich side of the stoichiometric air-fuel ratio. In this case, the air-fuel ratio of the engine is also controlled so that the central value of the air-fuel ratio feedback control coincides with the stoichiometric air-fuel ratio.

However, even if the output VOM of the upstream $O_2$ sensor oscillates about the stoichiometric air-fuel ratio, the actual center of the feedback control can deviate largely from the stoichiometric air-fuel ratio. This occurs, for example, when the output characteristics of the upstream $O_2$ sensor are changed, or when the upstream $O_2$ sensor is considerably affected by the change of the characteristics of the fuel injector of a certain cylinder, which may be different from one of the other cylinders.

FIGS. 1(A) through (D) and FIGS. 2(A) through (D) show the response curves of the output VOS of the downstream $O_2$ sensor when the central value of the feedback control deviates considerably from the stoichiometric air-fuel ratio. In the figures, the solid lines show the response of VOS under normal catalyst conditions and the dotted lines show the same under deteriorated catalyst conditions. Note that in these cases, the response curves of VOS do not intersect with the stoichiometric air-fuel ratio line, i.e., the reversal of the output VOS does not occur regardless of deterioration of the catalyst. Accordingly, it is not possible to detect the deterioration of the catalyst from the interval of reversal of the output VOS of the downstream $O_2$ sensor.

The hatched portions in FIG. 1(A) through (D) and FIGS. 2(A) through (D) indicate the areas surrounded by the response curves of the output VOS of the downstream $O_2$ sensor and predetermined reference value lines.

In FIGS. 1(A) through (D), the minimum value of the output VOS during each oscillation cycle is taken as the reference value. In this case, the areas are always larger when the catalyst has deteriorated (FIGS. 1(A) and (B)) comparing with the areas when the catalyst has not deteriorated (FIGS. 1(C) and (D)). Therefore, if the area is larger than a predetermined value, it can be determined that the catalyst has deteriorated.

Alternatively, in FIGS. 2(A) through (D) the 0 volt line is taken as the reference value line. In this case, the area becomes maximum when the catalyst is normal and the central value of the air-fuel ratio feedback control deviates from the stoichiometric air-fuel ratio to the rich air-fuel ratio side (FIG. 2(C)). The area becomes minimum also when the catalyst is normal, but the central value of the feedback control deviates from the stoichiometric value to the lean air-fuel ratio side (FIG. 2(D)). When the catalyst has deteriorated, (FIGS. 2(A) and (B)), the area is always between the above maximum value (FIG. 2(C)) and minimum value (FIG. 2(D)). Therefore, in this case, if the area is between two predetermined values, it can be determined that the catalyst has deteriorated.

In the embodiment explained below, the determination of the catalyst is carried out based on the area surrounded by the response curve of the output VOS of the downstream $O_2$ sensor (more specifically, based on the ratio of the area surrounded by the response curve of the output VOS of the downstream $O_2$ sensor and the area surrounded by the response curve of the output VOM of the upstream $O_2$ sensor), using the relationships shown in FIG. 1 or FIG. 2.

Figure 3:
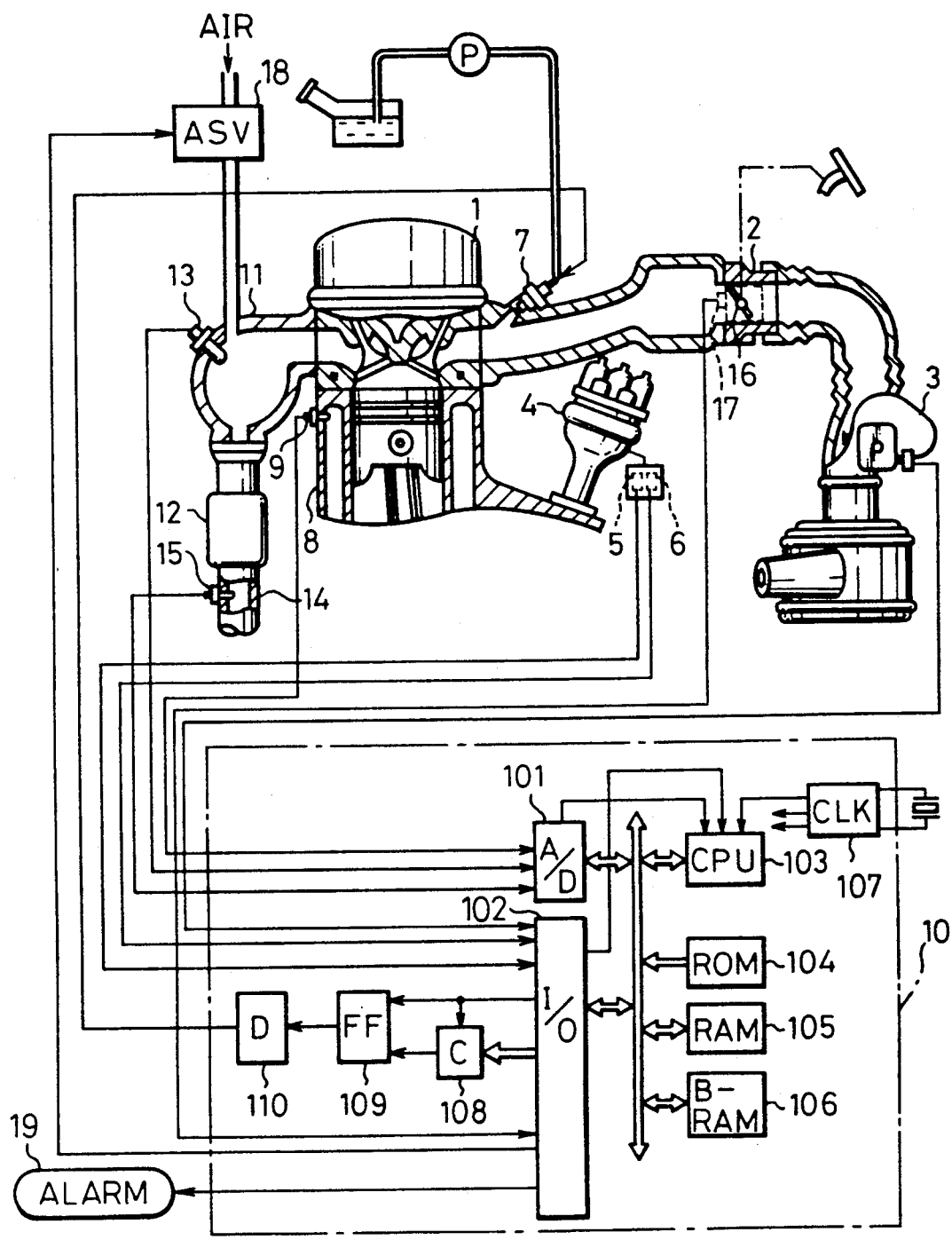
FIG. 3 is a schematic view of an internal combustion engine showing an embodiment of the present invention.

FIG. 3 schematically illustrates an embodiment of the device for determining the deterioration of the catalyst for carrying out the determination method explained above.

In FIG. 3, reference numeral 1 represents an internal combustion engine for an automobile. An air-intake passage 2 of the engine 1 is provided with a potentiometer-type airflow meter 3 for detecting an amount of air drawn into the engine 1 and generates an analog voltage signal proportional to the amount of air flowing therethrough. The signal from the air-flow meter 3 is transmitted to a multiplexer-incorporating analog-to-digital (A/D) converter 101 of the control circuit 10.

Crank angle sensors 5 and 6, for detecting the angle of the crankshaft (not shown) of the engine 1, are disposed at a distributor 4.

In this embodiment, the crank angle sensor 5 generates a pulse signal at every 720° C. crank angle (CA) and the crank angle sensor 6 generates a pulse signal at every 30° CA. The pulse signals from the crank angle sensors 5 and 6 are supplied to an input/output (I/0) interface 102 of the control circuit 10. Further, the pulse signal of the crank angle sensor 6 is then supplied to an interruption terminal of a central processing unit (CPU) 103.

In the air intake passage 2, a fuel injection valve 7 is provided at an inlet port of each cylinder of the engine 1, for supplying pressurized fuel from the fuel system to the cylinders of the engine.

A coolant temperature sensor 9 for detecting the temperature of the coolant is disposed in a water jacket of a cylinder block 8 of the engine 1. The coolant temperature sensor 9 generates an analog voltage signal in response to the temperature THW of the coolant and transmits this signal to the A/D converter 101 of the control circuit 10.

In the exhaust system, a three-way reducing and oxidizing catalytic converter 12 is disposed in the exhaust passage downstream of the exhaust manifold 11. The catalytic converter 12 is able to remove three pollutants in the exhaust gas, i.e., CO, HC, and $NO_x$, simultaneously.

An upstream $O_2$ sensor 13 is provided at the exhaust manifold 11, i.e., upstream of the catalytic converter 12.

A downstream $O_2$ sensor 15 is disposed at an exhaust pipe 14 downstream of the catalytic converter 12.

The upstream $O_2$ sensor 13 and the downstream $O_2$ sensor 15 generate output signals corresponding to the concentration of the oxygen component in the exhaust gas.

More specifically, the $O_2$ sensors 13 and 15 generate output voltage signals which are changed in accordance with whether the air-fuel ratio of the exhaust gas is rich or lean, compared with the stoichiometric air-fuel ratio. The signals output by the $O_2$ sensors 13 and 15 are transmitted to the A/D converter 101 of the control circuit 10.

The control circuit 10, which may be constructed by a microcomputer, further comprises a central processing unit (CPU) 103, a read-only-memory (ROM) 104 for storing a main routine and interrupt routines such as a fuel injection routine, an ignition timing routine and constants, etc., a random-access-memory 105 (RAM) for storing temporary data, a backup RAM 106, and a clock generator 107 for generating various clock signals. The backup RAM 106 is directly connected to a battery (not shown), and therefore the content of the backup RAM 106 is preserved even when the ignition switch (not shown) is turned off.

A throttle valve 16 operated by a vehicle driver is provided in the intake air passage 2 together with an idle switch 17 for detecting the opening of the throttle valve and generating a signal ("LL signal") when the throttle valve 16 is fully closed. This LL signal is supplied to the I/0 interface 102 of the control circuit 10.

Reference numeral 18 designates a secondary air supply valve for introducing secondary air to the exhaust manifold 11 to thereby reduce the emission of HC and CO during a deceleration or idling operation of the engine.

Reference numeral 19 designates an alarm which is activated when it is determined that the catalytic converter 12 has deteriorated.

A down counter 108, a flip-flop 109, and a drive circuit 110 are provided in the control circuit 10 for controlling the fuel injection valve 7.

When a fuel injection amount TAU is calculated in a routine, as explained later, the amount TAU is preset in the down counter 108, and simultaneously, the flip-flop 109 is set, and, as a result, the drive circuit 110 initiates the activation of the fuel injection valve 7. On the other hand, the down counter 108 counts up the clock signal from the clock generator 107, and, finally, a logic "1" signal is generated from the terminal of the down counter 108 to reset the flip-flop 109, so that the drive circuit 110 stops the activation of the fuel injection valve 7, whereby an amount of fuel corresponding to the fuel injection amount TAU is supplied to the cylinders.

Interruptions occur at the CPU 103 when the A/D converter 101 completes an A/D conversion and generates an interrupt signal; when the crank angle sensor 6 generates a pulse signal; and when the clock generator 107 generates a special clock signal.

The intake air amount data Q from the air flow meter 3 and the coolant temperature data THW from the coolant sensor 9 are fetched by an A/D conversion routine(s) executed at predetermined intervals and then are stored in the RAM 105; i.e., the data Q and THW in RAM 105 are renewed at predetermined intervals. The engine speed $N_e$ is calculated by an interrupt routine executed at 30° CA, i.e., at every pulse signal of the crank angle sensor 6, and is stored in the RAM 105.

The operation of the control circuit 10 of FIG. 3 is now explained.

Figure 4A:
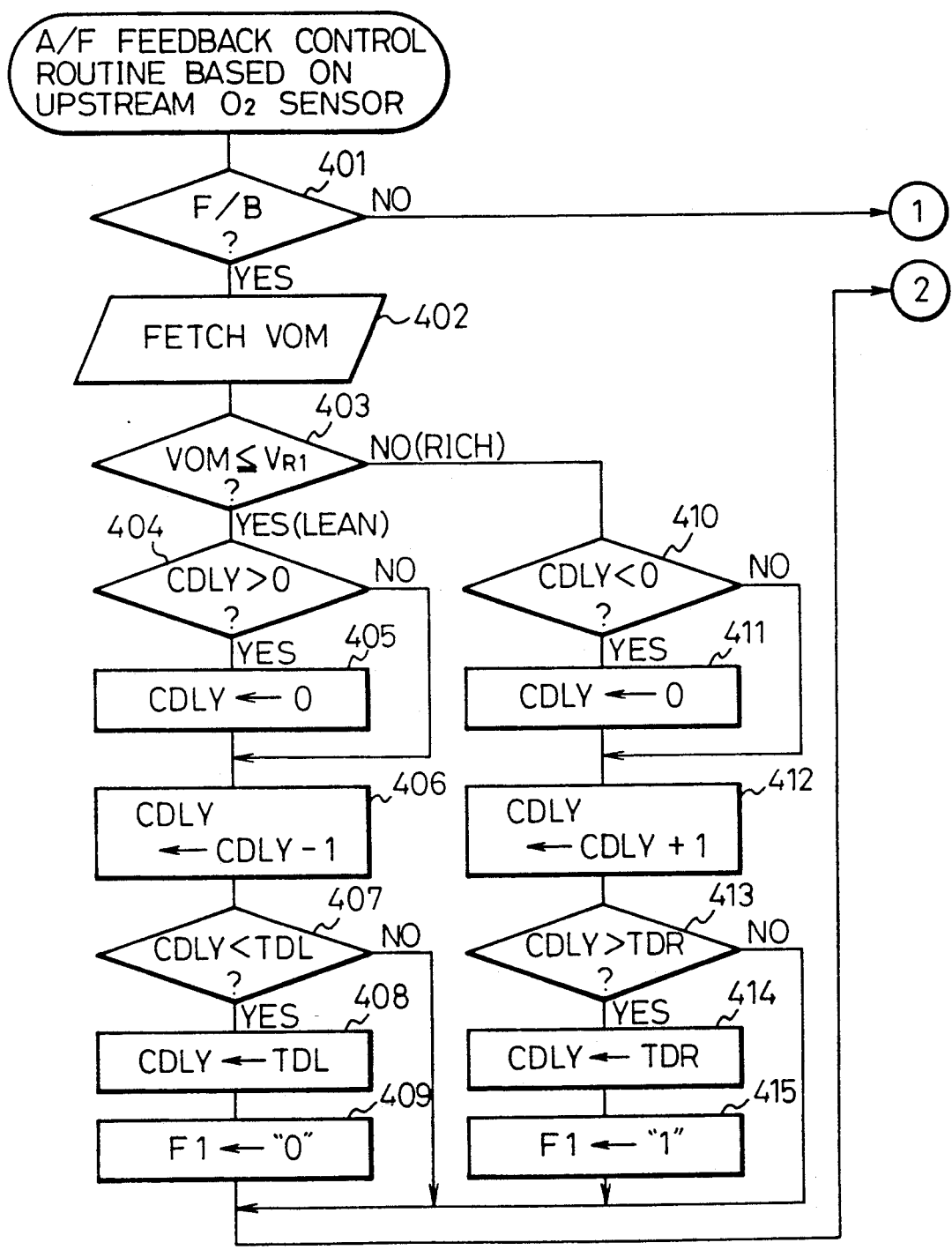
Figure 4B:
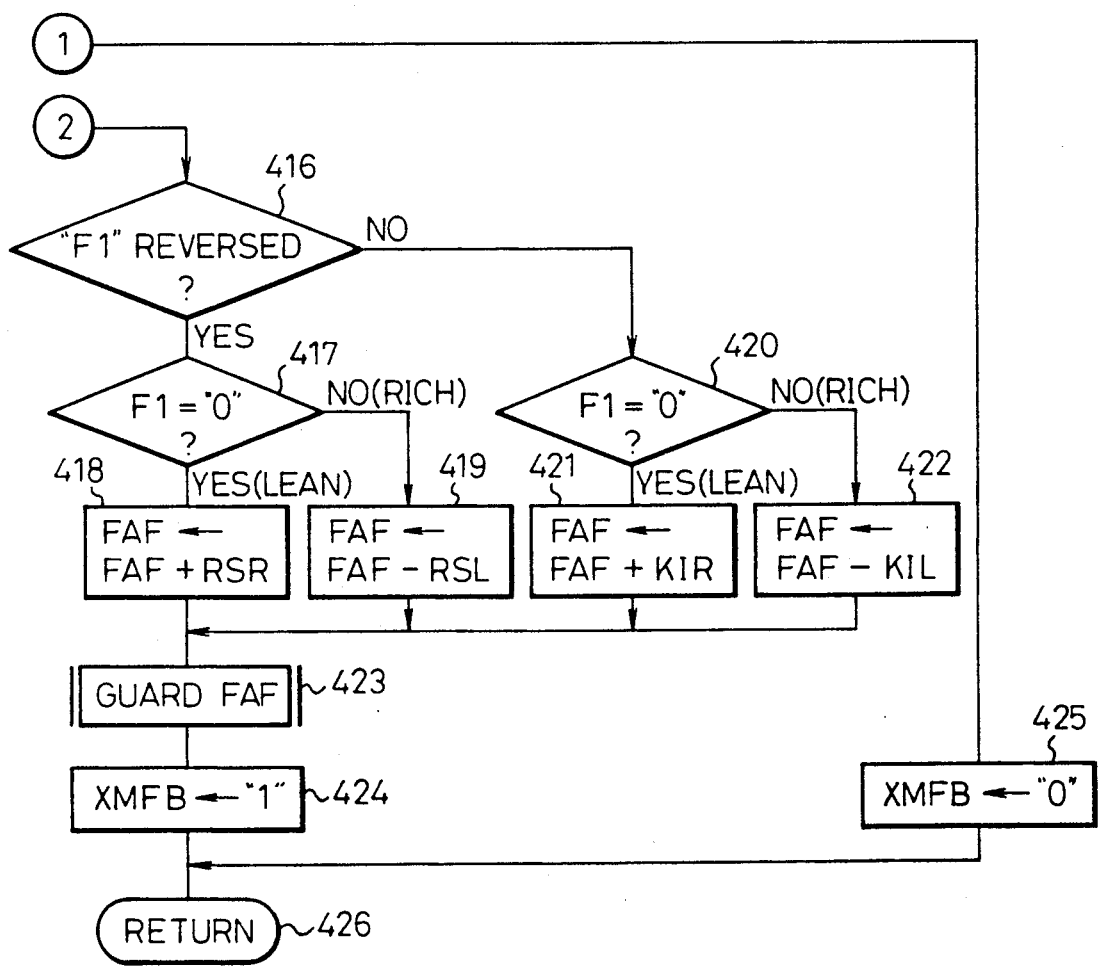

FIGS. 4A and 4B show a routine for feedback control of the air-fuel ratio. This routine calculates an air-fuel ratio correction factor FAF in accordance with the output VOM of the upstream $O_2$ sensor 13 and is executed at predetermined intervals of, e.g., 4 ms.

At step 401 in FIG. 4A, it is determined whether or not all conditions for air-fuel ratio feedback control are satisfied. The conditions for feedback control are, for example:

1) the engine is not being started,
2) the coolant temperature is higher than a predetermined value,
3) fuel increments, such as a start-up fuel increment, a warming-up fuel increment, a power fuel increment, or an OTP fuel increment for preventing an excess rise in the temperature of the catalytic converters, are not being carried out,
4) the output of the upstream $O_2$ sensor 13 has been reversed (i.e., changed from a rich air-fuel ratio output signal to a lean air-fuel ratio output signal or vice versa) at least once,
5) a fuel cut operation is not being carried out.

If any one of these conditions is not satisfied, the routine proceeds to step 425 in FIG. 4B, where the air-fuel ratio feedback control flag XMFB to set to "0", then the routine ends at step 426.

If all of the conditions for air-fuel ratio feedback control are satisfied at step 401, the routine proceeds to step 402.

At step 402, A/D conversion is performed upon the output voltage VOM of the upstream $O_2$ sensor 13. The A/D converted value is then fetched from the A/D converter 101. Then, at step 403, the voltage VOM is compared with a reference voltage $V_{R1}$ to determine whether the current air-fuel ratio detected by the upstream $O_2$ sensor 13 is on the rich side or on the lean side with respect to the stoichiometric air-fuel ratio. The reference voltage $V_{R1}$ is usually set at or near the central value of the maximum amplitude of the output of the $O_2$ sensor. In this embodiment, $V_{R1}$ is set to 0.45 V.

If $VOM \leq V_{R1}$, which means that the current air-fuel ratio is lean, the control proceeds to step 404, where it is determined whether or not the value of a delay counter CDLY is positive. If CDLY>0, the control proceeds to step 405, where the delay counter CDLY is cleared, then the routine proceeds to step 406. If CDLY≦0, the control proceeds directly to step 406. At step 406, the delay counter CDLY is counted down by 1, and at step 407, it is determined whether or not CDLY<TDL. Note that TDL is a lean delay time for which a rich state is maintained even after the output of the upstream $O_2$ sensor 13 is changed from the rich side to the lean side and is defined by a negative value. Therefore, at step 407, only when CDLY<TDL does the control proceed to step 408, where CDLY is made TDL, and then to step 409, where an air-fuel ratio flag F1 to made "0" (lean state). On the other hand, if $V_{OM} > V_{R1}$, which means that the current air-fuel ratio is rich, the control proceeds to step 410, where it is determined whether or not the value of the delay counter CDLY is negative. If CDLY<0, the control proceeds to step 411, where the delay counter CDLY is cleared, and then proceeds to step 412. If CDLY≧0, the control directly proceeds to 412. At step 412, the delay counter CDLY is counted up by 1, and at step 413, it is determined whether or not CDLY>TDR. Note that TDR is a rich delay time for which a lean state is maintained even after the output of the upstream $O_2$ sensor 13 is changed from the lean side to the rich side and is defined by a positive value. Therefore, at step 413, only when CDLY>TDR does the control proceed to step 414, where CDLY is made TDR, and then to step 415, where the air-fuel ratio flag F1 is made "1" (rich state).

Next, at step 416 in FIG. 4B, it is determined whether or not the air-fuel ratio flag F1 is reversed, i.e., whether or not the delayed air-fuel ratio detected by the upstream $O_2$ sensor 13 is reversed. If the air-fuel ratio flag F1 is reversed, the control proceeds to steps 417 to 419, where a skip operation is carried out. That is, if the flag F1 is "0" (lean) at step 417, the control proceeds to step 418, where the correction factor FAF is remarkably increased by a skip amount RSR. Also, if the flag F1 is "1" (rich) at step 417, the control proceeds to step 419, where the correction factor FAF is remarkably reduced by the skip amount RSL. On the other hand, if the air-fuel ratio flag F1 is not reversed at step 416, the control proceeds to steps 420 to 422, where an integration operation is carried out. That is, if the flag F1 is "0" (lean) at step 420, the control proceeds to step 421, where the correction factor FAF is gradually increased by a rich integration amount KIR. Also, if the flag F1 is "1" (rich) at step 420, the control proceeds to step 422, where the correction factor FAF is gradually reduced by a lean integration amount KIL.

Then, at step 423, the air-fuel ratio correction factor FAF is guarded, for example, by a minimum value of 0.8 and by a maximum value of 1.2, to thereby prevent the controlled air-fuel ratio from becoming too rich or too lean.

The correction factor FAF is then stored in the RAM 105 and the routine proceeds to step 424, where the air-fuel ratio feedback control flag XMFB is made "1", and then the routine terminates at step 426.

Figure 5A:
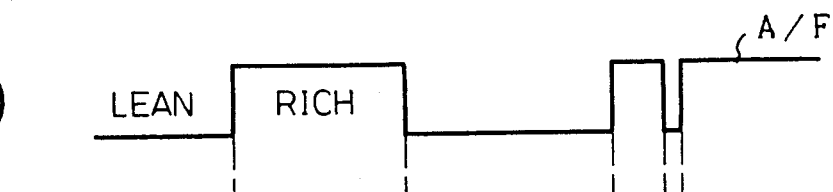
FIGS. 5A to D are timing diagrams explaining the flow chart of FIGS. 4A and 4B.
Figure 5B:
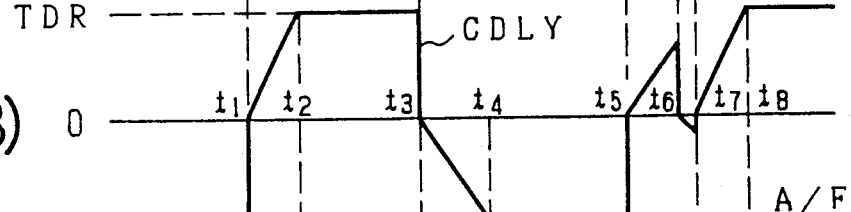
Figure 5C:
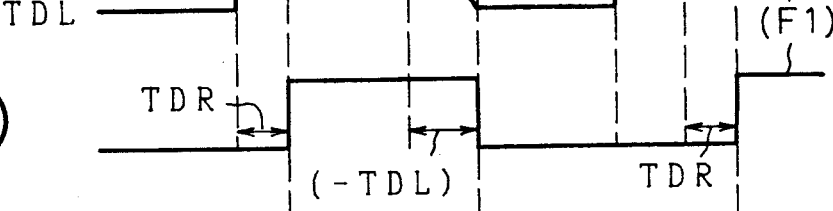
Figure 5D:
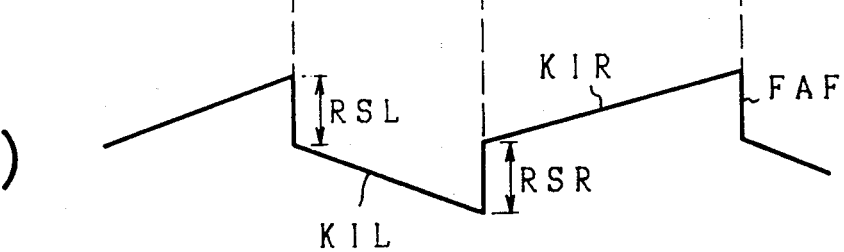

The control operation by the flow charts of FIGS. 4A and 4B are further explained with reference to FIGS. 5A to 5D. As illustrated in FIG. 5A, when the air-fuel ratio A/F is obtained by the output of the upstream $O_2$ sensor 13, the delay counter CDLY is counted up during a rich state and is counted down during a lean state, as illustrated in FIG. 5B. As a result, a delayed air-fuel ratio corresponding to the air-fuel ratio flag F1 is obtained as illustrated in FIG. 5C. For example, at time $t_1$, even when the air-fuel ratio A/F is changed from the lean side to the rich side, the delayed air-fuel ratio F1 is changed at time $t_2$ after the rich delay time TDR. Similarly, at time $t_3$, even when the air-fuel ratio A/F is changed from the rich side to the lean side, the delayed air-fuel ratio A/F' (F1) is changed at time $t_4$ after the lean delay time TDL. At time $t_5$, $t_6$, or $t_7$, however, when the air-fuel ratio A/F is reversed in a shorter time than the rich delay time TDR or the lean delay time TDL, the delayed air fuel ratio F1 is reversed at time $t_8$. That is, the delayed air-fuel ratio A/F' (F1) is stable when compared with the air-fuel ratio A/F. Further, as illustrated in FIG. 5D, at every change of the delayed air-fuel ratio F1 from the rich side to the lean side, or vice versa, the correction factor FAF is skipped by the skip amount RSR or RSL, and the correction factor FAF is gradually increased or reduced in accordance with the delayed air-fuel ratio F1.

Next, the air-fuel ratio feedback control of the double $O_2$ sensor system in which the air-fuel ratio is controlled based on the output of the downstream $O_2$ sensor 15 as well as the output of the upstream $O_2$ sensor 13 is explained.

Generally, three types of air-fuel ratio feedback control operations by the downstream $O_2$ sensor 15 are used, i.e., the type in which one or more of the parameters such as the skip amounts RSR, RSL, integration amounts KIR, KIL, and delay times TDR, TDL are variable, the type in which the reference voltage $V_{R1}$ of the outputs VOM of the upstream $O_2$ sensor is variable, and the type in which a second air-fuel ratio correction factor FAF2 calculated in accordance with the output of the downstream $O_2$ sensor 15 is introduced.

For example, if the rich skip amount RSR is increased or if the lean skip amount RSL is decreased, the controlled air-fuel ratio becomes richer, and if the lean skip amount RSL is increased or if the rich skip amount RSR is decreased, the controlled air-fuel ratio becomes leaner. Thus, the air-fuel ratio can be controlled by changing the rich skip amount RSR and the lean skip amount RSL in accordance with the output of the downstream $O_2$ sensor 15. Further, if the rich integration amount KIR is increased or if the lean integration amount KIL is decreased, the controlled air-fuel ratio becomes richer, and if the lean integration amount KIL is increased or if the rich integration amount KIL is decreased, the controlled air-fuel ratio becomes leaner. Thus, the air-fuel ratio can be controlled by changing the rich integration amount KIR and the lean integration amount KIL in accordance with the output of the downstream $O_2$ sensor 15. Further, if the reference voltage $V_{R1}$ is increased, the controlled air-fuel ratio becomes richer, and if the reference voltage $V_{R1}$ is decreased, the controlled air-fuel ratio becomes leaner. Thus, the air-fuel ratio can be controlled by changing the reference voltage $V_{R1}$ in accordance with the output of the downstream $O_2$ sensor 15.

Also, if the rich delay time becomes longer than the lean delay time (TDR>TDL), the controlled air-fuel ratio becomes richer, and if the lean delay time becomes longer than the rich delay time (TDL>TDR), the controlled air-fuel ratio becomes leaner. Thus the air-fuel ratio can be controlled by changing the rich delay time period TDR and the lean delay time period TDL in accordance with the output of the downstream $O_2$ sensor 15.

These types of operations of the air-fuel ratio have respective advantages. For example, if the delay times TDR, TDL are variable, precise control of the air-fuel ratio can be obtained, and if the skip amounts RSR, RSL are variable, the response of the control is improved. Naturally, two or three of these types of operations can be used at the same time.

Figure 6A:
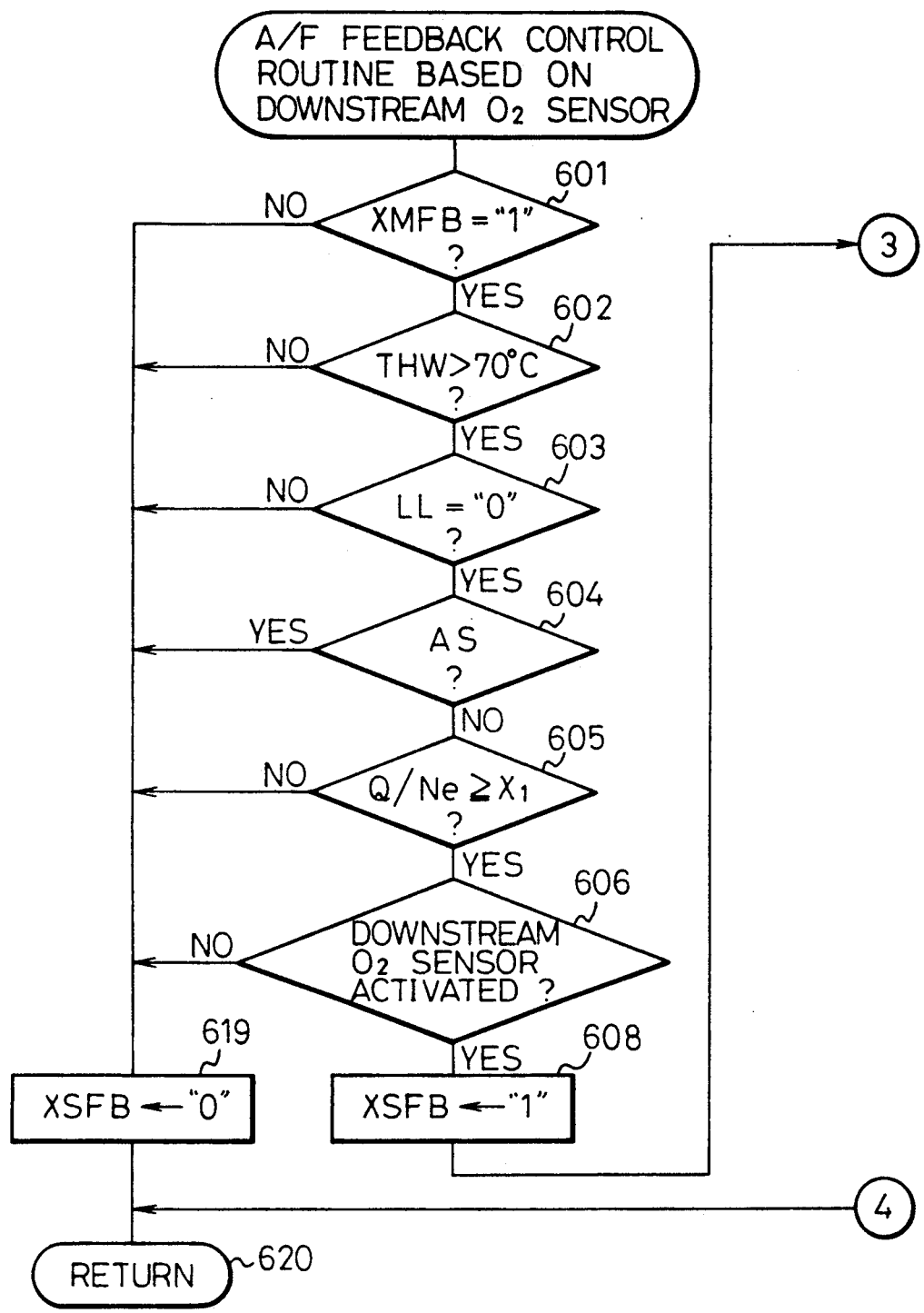
Figure 6B:
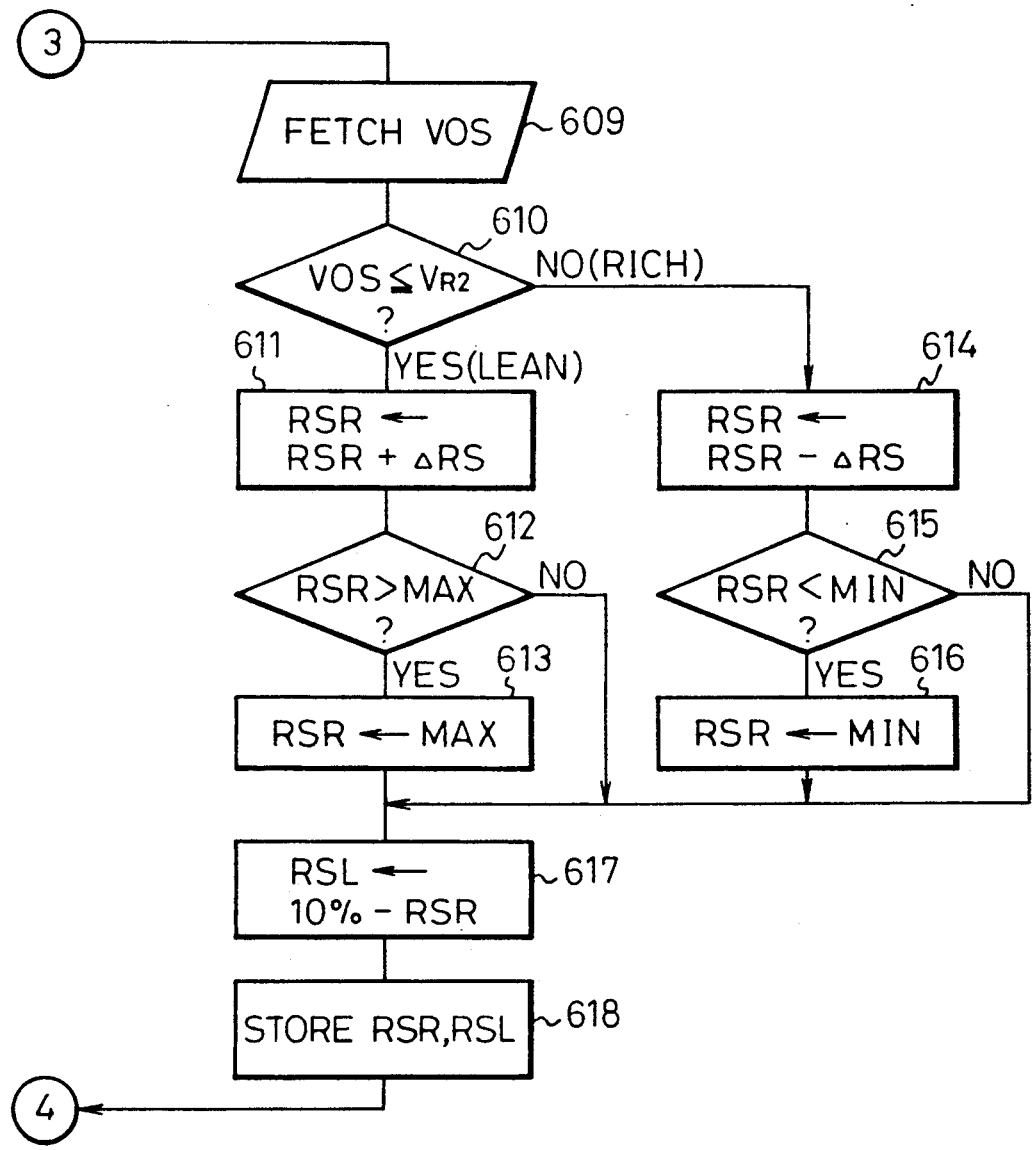

FIGS. 6A and 6B show a flow chart of the control operation of the double $O_2$ sensor systems in which the skip amounts RSR, RSL are varied in accordance with the output VOS of the downstream $O_2$ sensor 15. This routine is executed at predetermined intervals such as 512 ms.

The steps from 601 to 606 of FIG. 6A show the operation for determining whether the conditions for executing the feedback control based on the output of the downstream O₂ sensor 15 are satisfied These conditions are, 1) the conditions for executing the air-fuel ratio feedback control based on the outputs of the upstream O₂ sensor 13 are satisfied (the air-fuel ratio feedback control flag XMFB="1" at step 601), 2) the temperature THW of the coolant is higher than a predetermined value (e.g., 70° C.) (step 602), 3) the throttle valve 16 is not fully closed (i.e., the signal LL is not ON), (step 603), 4) the secondary air AS is not introduced into the exhaust manifold, (step 604), 5) the load of the engine represented by $Q/N_e$ is more than a predetermined value $X_1$ (i.e., $Q/N_e \geq X_1$), (step 605), 6) the downstream O₂ sensor 15 is activated (step 606).

If any one of these conditions is not satisfied, the routine proceeds to step 619, in which an air-fuel ratio feedback control operation flag XSFB is reset ("0").

If all of the conditions of steps 601 to 606 are satisfied, the flag XSFB is set ("0") at step 608, and the routine proceeds to step 609 of FIG. 6B.

The steps 609 through 618 illustrate the operation for calculating the skip amounts RSR or RSL in accordance with the output VOS of the downstream O₂ sensor 15.

At step 609, A/D conversion is performed on the output voltage VOS of the downstream O₂ sensor 15, and the A/D converted value thereof is then fetched from the A/D converter 101. Then, at step 610, the voltage VOS is compared with a reference voltage $V_{R2}$ such as 0.55 V, to thereby determine whether the current air-fuel ratio detected by the downstream O₂ sensor 15 is on the rich side or on the lean side with respect to the stoichiometric air-fuel ratio. Note that the reference voltage $V_{R2}$ (0.55 V) is preferably higher than the reference voltage $V_{R1}$ (0.45 V), in consideration of the difference in output characteristics and rate of deterioration of the O₂ sensor 13 upstream of the catalytic converters and the O₂ sensor 15 downstream of the catalytic converters.

If $VOS \leq V_{R2}$ (lean state) at step 610, then the routine proceeds to steps 611 to 613, and if $VOS > V_{R2}$ (rich state), the routine proceeds to steps 614 to 616. Namely, at step 611, the rich skip amount RSR is increased by ΔRS (constant value), to thereby shift the air-fuel ratio to the rich side. Then at steps 612 and 613, the skip amount RSR is guarded by a maximum value MAX (e.g., approximately 7.5%). On the other hand, at step 614, the rich skip amount is decreased by ΔRS, to thereby shift the air-fuel ratio to the lean side. Then, at steps 615 and 616, the rich skip amount RSR is guarded by a minimum value MIN (e.g., approximately 2.5%). The maximum value MAX is selected so that the amount of change of the air-fuel ratio is maintained within a range which does not worsen drivability, and the minimum value MIN is selected so that the response of the control in a transient condition is not worsened.

At step 617, the lean skip amount RSL is calculated by $$RSL \leftarrow 10\% - RSR.$$

Namely, the sum of RSR and RSL is maintained at 10%. Then at step 618, the skip amounts RSR and RSL are stored in the backup RAM 106, and the routine terminates at step 620 in FIG. 6A.

Figure 7:
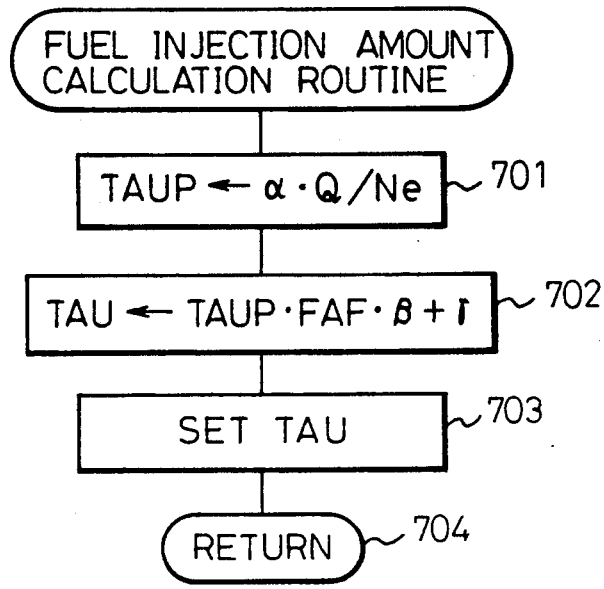

FIG. 7 shows a routine for calculating the fuel injection amount using the air-fuel ratio correction factor FAF calculated by the routine of FIGS. 4A and 4B.

At step 701, a basic fuel injection amount TAUP is calculated in accordance with the amount of the intake air per one revolution of the engine, $Q/N_e$, by $$TAUP \leftarrow \alpha \cdot Q/N_e$$

where, TAUP is the fuel injection amount required to obtain the stoichiometric air-fuel ratio and α is a predetermined constant.

Then, at step 702, a fuel injection amount TAU is calculated by $$TAU \leftarrow TAUP \cdot FAF \cdot \beta + \gamma$$

where, β and γ are correction factors determined by operating conditions of the engine. The calculated TAU is set to the down counter 108 and a flip-flop 109 is set at step 703, whereby fuel injection is started.

As stated before, when the time corresponding to TAU has elapsed, the flip-flop 109 is reset by the signal from the down counter 108, whereby the fuel injection is terminated.

FIGS. 8A to 8D show the routine for determining whether or not the catalytic converter 12 has deteriorated. This routine is executed by the control circuit 10 at predetermined intervals such as 4 ms.

Figure 8A:
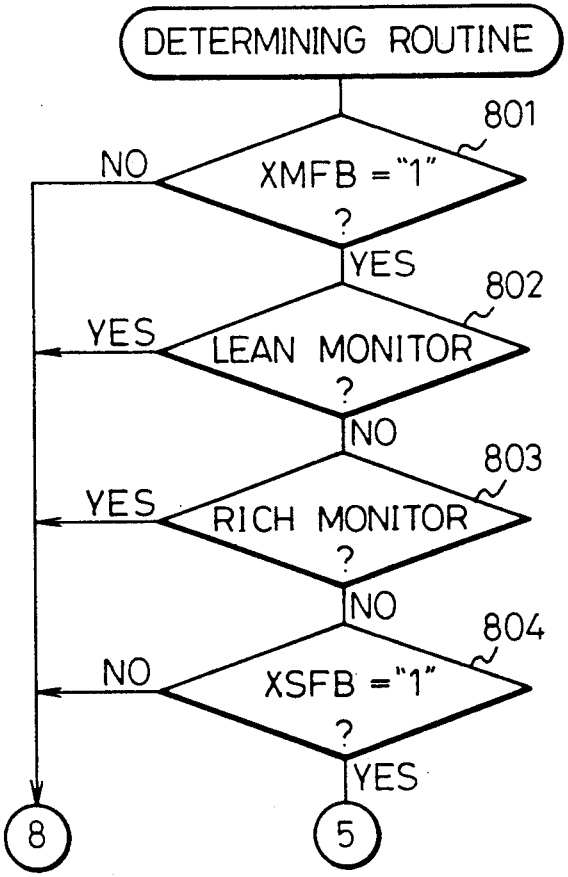

When the routine is started, it is determined at step 801 in FIG. 8A, whether or not the air-fuel ratio feedback control based on the output VOM of the upstream O₂ sensor 13 is being carried out, by determining the value of the flag XMFB. If the feedback control is being carried out (i.e., XMFB="1" at step 801), it is determined by a lean monitor at step 802 and a rich monitor at step 803 whether or not a lean side condition or a rich side condition of the output VOM of the upstream O₂ sensor is being maintained for more than a predetermined time. At step 804, it is determined whether or not the air-fuel ratio feedback control based on the output VOS of the downstream O₂ sensor 15 is being carried out, by determining the value of the flag XSFB.

The determination of the deterioration of the catalyst (steps 805 to 823) is carried out only when the air-fuel ratio feedback control based on both VOM and VOS is carried out (XMFB="1" at step 801 and XSFB="1" at step 804), and the output VOM of the upstream O₂ sensor 13 does not stay at the lean side or the rich side for more than a predetermined time (steps 802 and 803).

The reason why the lean monitor (step 802) and the rich monitor (step 803) are required is because if the output VOM stays on the lean side or rich side (i.e., if the response curve of the output VOM does not intersect the reference voltage line), the value of AVOM is not calculated effectively. Namely, the determination of the deterioration of the catalyst is carried out only when the shape of the response curve of the output VOM is similar to the response curve shown in (E) of FIG. 2.

Figure 8B:
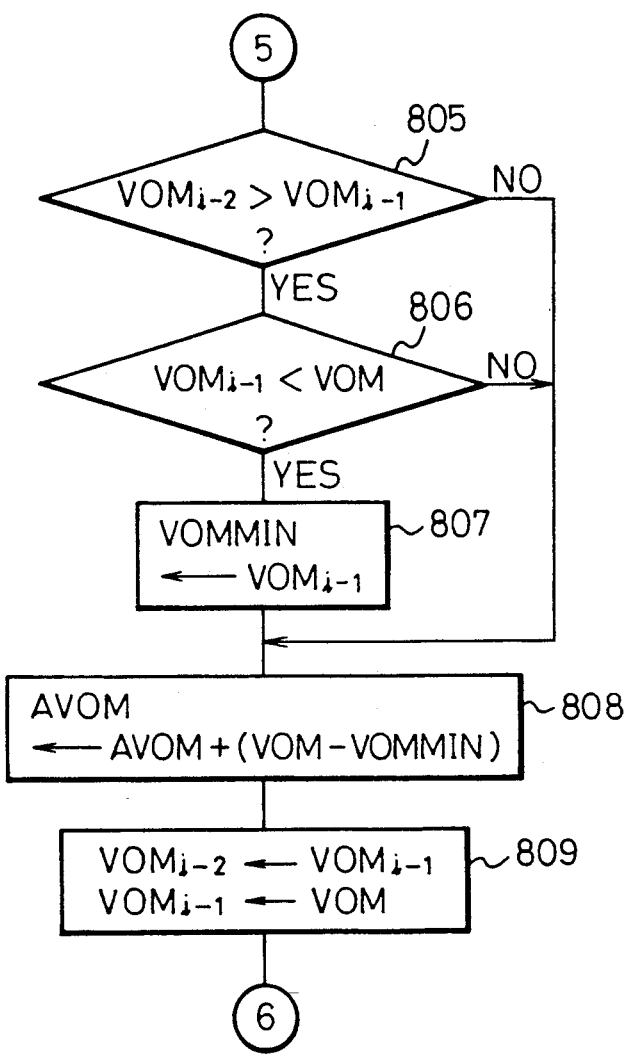
Figure 8C:
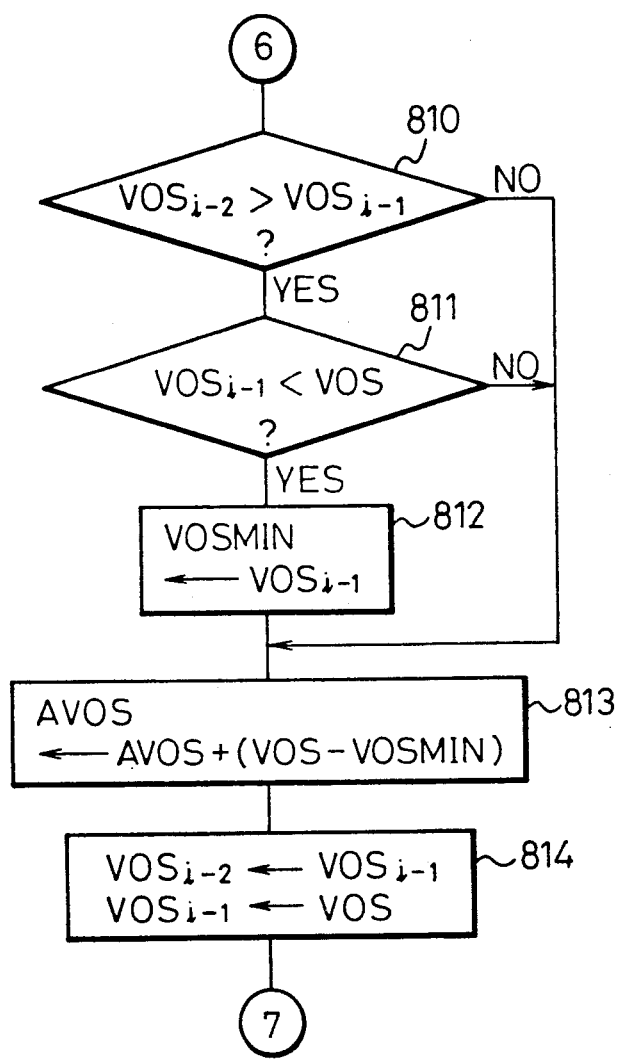

Steps 805 to 809 in FIG. 8B and steps 810 to 814 in FIG. 8C show the calculation of the areas surrounded by the response curve of the output curves of the O₂ sensors 13, 15 and the reference value lines. In this embodiment, the minimum values of the fluctuation of the outputs of the respective $O_2$ sensors are used as the reference values.

Steps 805 to 807 in FIG. 8B show the detecting steps of the minimum value VOMMIN of the output VOM of the upstream $O_2$ sensor 13.

At steps 805 and 806, the inclination of the response curve of the output VOM is determined using VOM, $VOM_{i-1}$ and $VOM_{i-2}$, where, $VOM_{i-1}$ is the value of the output VOM when the routine was last executed and $VOM_{i-1}$ is the value of the output VOM when the routine was executed one time before that. Namely, at step 805, it is determined whether or not the inclination of the response curve was negative (decreasing) when the routine was last executed, and at step 805 it is determined whether or not the current inclination of the response curve is positive (increasing). If $VOM_{i-2} >$ $VOM_{i-1}$ at step 805 and $VOM_{i-1} <$ VOM at step 806, that means $VOM_{i-1}$ is the minimum value of the fluctuation of the output VOM, the minimum value VOMMIN is replaced by $VOM_{i-1}$ at step 807, and the routine proceeds to step 808. If either one of the conditions of steps 805 and 806 is not satisfied, the minimum value VOMMIN is not changed and the routine proceeds directly to step 808. By the steps 805 to 807, the latest minimum value of the fluctuation of the output VOM is stored as VOMMIN.

At step 808, the area AVOM surrounded by the response curve of the output VOM and the minimum value line (hatched area in (C) and (D) in FIG. 1 is calculated by:

$$AVOM \leftarrow AVOM + (VOM - VOMMIN)$$

Then, at step 809, the parameters $VOM_{i-2}$ and $VOM_{i-1}$ are changed to prepare for the next execution of the routine.

Figure 1A:
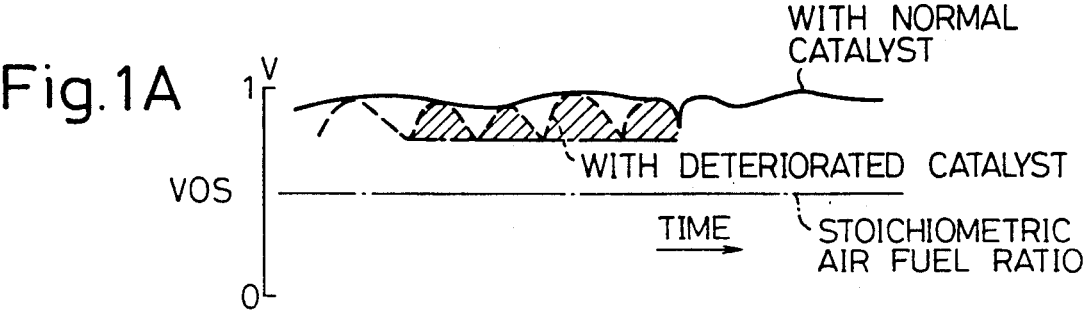
FIGS. 1A-1D and FIGS. 2A-2E show the changes in output response curves of the downstream $O_2$ sensor caused by deterioration of the catalyst.
Figure 1B:
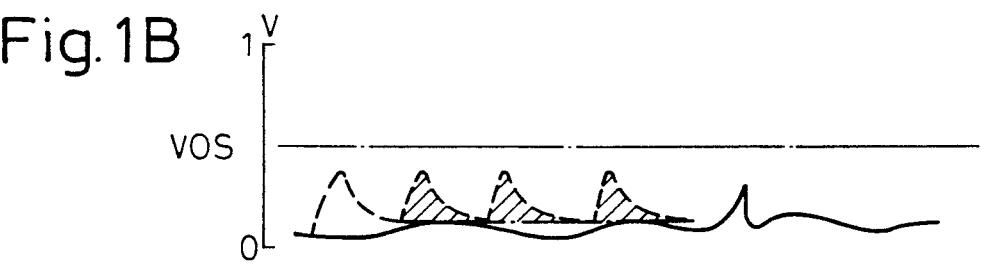
Figure 1C:
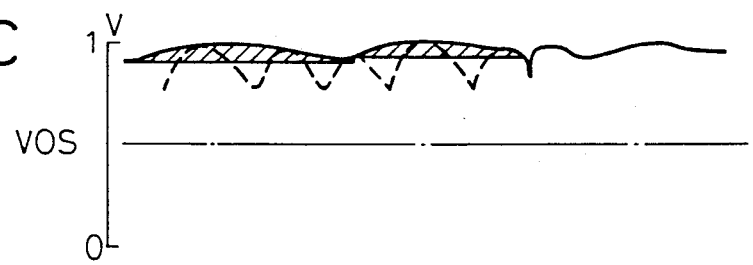
Figure 1D:
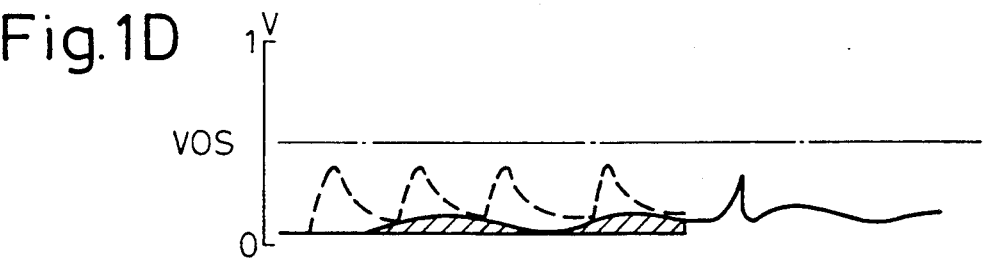

At steps 810 to 814 in FIG. 8C, the area AVOS surrounded by the response curve of the output VOS of the downstream $O_2$ sensor 15 and the minimum value line VOSMIN (hatched area in FIG. 1(A) and (B)) is calculated. The steps 810 to 814 in FIG. 8C exactly correspond to the steps 805 to 809 in FIG. 8B, so further explanation is omitted.

Figure 8D:
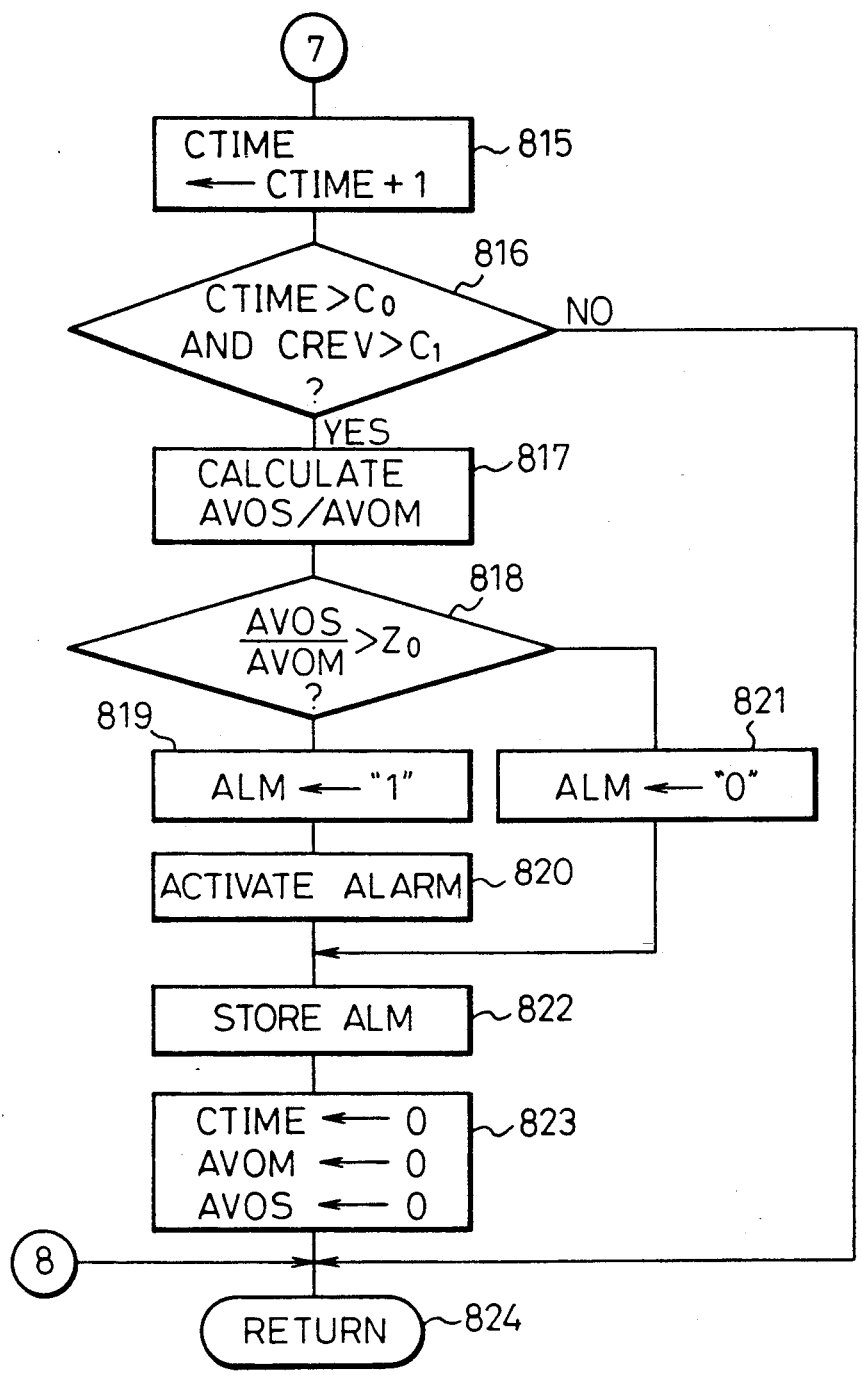

After the steps 805 to 814 in FIGS. 8B and 8C, the routine proceeds to steps 815 to 822 in FIG. 8D. The steps 815 to 822 show the process for determining the deterioration of the catalyst. At step 815, a counter CTIME is increased by 1, then at step 816, it is determined whether or not the conditions for executing the determination of the deterioration of the catalyst are satisfied.

The conditions are, 1) the counter CTIME exceeds a predetermined value $C_0$ and 2) another counter CREV exceeds a predetermined value $C_1$.

The value $C_0$ is the count of the execution of the routine corresponding to 40 reversals of the output VOM of the upstream $O_2$ sensor 13 (i.e., corresponds to approximately 20 seconds in this embodiment).

The counter CREV, as explained later in detail, represents the period that the output VOS of the downstream $O_2$ sensor 15 continuously stays on either the rich side or lean side.

If CTIME $> C_0$ and CREV $> C_1$ at step 816, the routine proceeds to step 817. Otherwise, the routine terminates at step 824.

At step 817, the ratio of the areas AVOS/AVOM is calculated, and at step 818, it is determined whether or not the ratio AVOS/AVOM is larger than a predetermined value $Z_0$.

If AVOS/AVOM is larger than $Z_0$, it is determined that the catalyst has deteriorated ((A)-(D) in FIG. 1, dotted line). If AVOS/AVOM is not larger than $Z_0$, it is determined that the catalyst is not deteriorated ((A)-(D) in FIG. 1, solid line).

In this embodiment, the deterioration of the catalyst is determined in accordance with the ratio AVOS/AVOM at step 818. However, it is also possible to determine the deterioration of the catalyst in accordance with the value AVOS (the area surrounded by the response curve of the output VOS of the downstream $O_2$ sensor) alone. In this case the condition AVOS/AVOM $> Z_0$ at step 807 is replaced with the condition AVOS $> Z_1$. The value $Z_0$ or $Z_1$ is determined in accordance with the type of the catalytic converter, the type of the engine, etc.

Note that it is preferable to use the ratio AVOS/AVOM than AVOS only in determining the deterioration of the catalytic converter. Since the value AVOS may be affected by the difference in the operating condition of the engine, the determination based on the value AVOS only also may be affected by the difference in the operating condition. However, if the ratio AVOS/AVOM is used for the determination, the effect caused by the differences in the operating condition are eliminated since the values AVOM and AVOS are equally affected by the differences in the operating conditions.

If it is determined that the catalyst has deteriorated at step 818, the routine proceeds to step 819, where an alarm flag ALM is made "1". Then, at step 820, the alarm 19 in FIG. 3 is activated to warn the driver that the catalyst has deteriorated. If it is not determined that the catalyst has deteriorated, the alarm flag ALM is reset ("0") at step 821.

In both cases, the value of the alarm flag ALM is stored in the backup RAM 106 of the control circuit 10 to prepare for future maintenance and inspection.

After executing the above steps, the parameters CTIME, AVOM, AVOS are cleared at step 823 to prepare for a next determining operation, and the routine is then terminated at step 824.

FIG. 9 shows the routine for setting the counter CREV to measure the period that the output VOS of the downstream $O_2$ sensor 15 continuously stays on either of rich side or lean side. In the routine in FIG. 9, it is determined whether or not the output VOS stays on the same side (rich or lean) of the stoichiometric air-fuel ratio as when the routine was last executed. If the output VOS stays on the same side, the counter CREV is increased by 1, otherwise the counter CREV is reset ("0").

Namely, at step 901 in FIG. 9, it is determined whether or not the output VOS is larger than the reference voltage $V_{R2}$. Then, at step 902 and 903, the value $VOS_{old}$ is compared with the reference voltage $V_{R2}$, where $VOS_{old}$ is the value of VOS when the routine was last executed.

If the outputs VOS and $VOS_{old}$ are on different sides L of the stoichiometric air-fuel ratio (VOS $> V_2$ at step 901 and $VOS_{old} \leq V_{R2}$ at step 902, or VOS $\leq V_{R2}$ at step 901 and $VOS_{old} > V_{R2}$ at step 903), the counter CREV is cleared ("0") at step 904 since this means that the response curve of the output VOS has intersected with the stoichiometric air-fuel ratio line ($V_{R2}$).

If the outputs VOS and $VOS_{old}$ are on the same side ($VOS > V_{R2}$ at step 901 and $VOS_{old} > V_{R2}$ at step 902, or $VOS \leq V_{R2}$ at step 901 and $VOS_{old} \leq V_{R2}$ at step 903), the routine directly proceeds to step 905 in which the counter CREV is increased by 1, then at step 907, $VOS_{old}$ is changed to prepare for the next execution of the routine.

By this routine, the value of the counter CREV always corresponds to the time that the output VOS continuously stays on the rich side or lean side.

Figure 10:
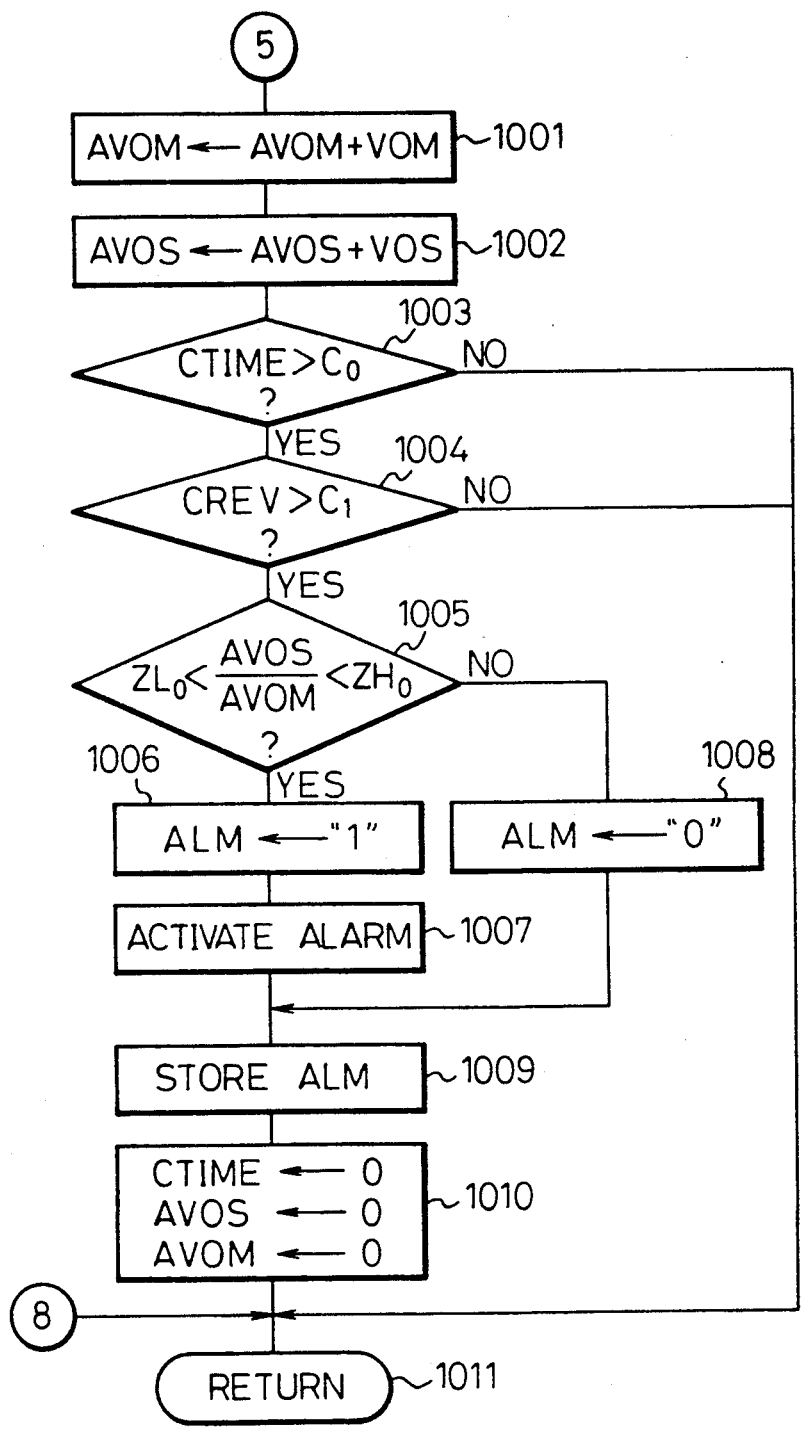

FIG. 10 shows another embodiment of the determination of the deterioration of the catalyst. In this embodiment, the areas AVOM and AVOS are calculated based on the reference value of 0 volt output (see (A) to (D) in FIG. 2). However, the above reference value can be selected arbitrarily. For example, assuming that the maximum and minimum outputs of the $O_2$ sensor are 1.0 volt and 0 volt respectively, the above reference value may be 0.5 volt which is a mean value of the maximum and minimum outputs. Also, though not shown in the drawing, the steps 801 to 804 in FIG. 8A are executed prior to the execution of the steps 1001 to 1011 and form a part of this routine.

At steps 1001 and 1002, the areas AVOM and AVOS are calculated based on the reference value of 0 volt. Then at steps 1003 and 1004, the values of the counters CTIME and CREV and determined in the same manner as step 816 in FIG. 8D. Then at step 1005, the deterioration of the catalyst is determined based on the ratio AVOS/AVOM. However, in this embodiment, it is determined that the catalyst has deteriorated only when the ratio AVOS/AVOM is between two predetermined values $ZL_0$ and $ZH_0$ ($ZL_0 < ZH_0$) (see (A) to (D) in FIG. 2).

Also, in this embodiment it is possible to determine the deterioration of the catalyst in accordance with the value AVOS alone. In this case, the condition $ZL_0 < AVOS/AVOM < ZH_0$ at step 1005 is replaced with the condition $ZL_1 < AVOS < ZH_1$. The values $ZL_0$, $ZH_0$ or $ZL_1$, $ZH_1$ are determined in accordance with the type of the catalytic converter, the type of engine, etc.

Further, in the embodiments of FIG. 8D and FIG. 10, it is possible to determine the deterioration of the catalyst based on a parameter AVOS/K instead of AVOS/AVOM, where K may be a constant or a value determined in accordance with the operating condition of the engine.

In the double $O_2$ sensor system explained above, the feedback control based on the upstream $O_2$ sensor is carried out every 4 ms, while the feedback control based on the downstream $O_2$ sensor is carried every 512 ms. This is to control the air-fuel ratio of the engine mainly by the upstream $O_2$ sensor so that a good response of the control is assured, and to use the downstream $O_2$ sensor which has a relatively lower response for only compensating for individual differences or changes of the characteristics of the upstream $O_2$ sensor.

The present invention also can be applied to other types of double $O_2$ sensor systems in which other control parameters of the feedback control based on the upstream $O_2$ sensor, such as delay times TDR and TDL and, the integration amounts KIR and KIL are variable or in which the second air-fuel ratio correction factor FAF2 is introduced.

Also, in the present invention it is possible to fix the value of one of the skip amounts RSR and RSL (or the delay times TDR and TDL or the integration amounts KIR and KIL) and to vary the other.

Further, though the air-fuel ratio feedback control in the above embodiment is carried out based on the outputs of both the upstream and downstream $O_2$ sensors, the present invention can also be applied to a double $O_2$ sensor system in which the air-fuel ratio feedback control is carried out based on the output of the upstream $O_2$ sensor alone. In this case, the downstream $O_2$ sensor is used only to determine the deterioration of the catalyst.

Also, in the above embodiment, the amount of the fuel injected to the engine is calculated in accordance with the amount of the intake air and the engine speed. However, the present invention can be applied to a system in which the amount of the fuel injection is calculated in accordance with the inlet manifold pressure and the engine speed, or the degree of opening of the throttle valve and the engine speed, etc. Further, instead of the potentiometer-type air flow meter of the above embodiment, a Karman vortex type or heat wire type air flow meter can be used equally well.

Further, the present invention can be applied to a fuel system other than the fuel injection system. For example, a carburetor type fuel system in which the air-fuel ratio is adjusted by controlling the amount of the inlet air by an electric air control valve (EACV), or by controlling the amount of the bleed air of the carburetor to adjust the amount of the atmospheric air introduced into the main system and the slow speed system of the carburetor. In these cases, the basic fuel amount corresponding to TAUP of the step 701 in FIG. 7 is determined by the carburetor itself in accordance with the inlet manifold pressure and the engine speed, and the amount of the inlet air supplied to the engine is calculated in accordance with the fuel injection amount TAU of the step 702 in FIG. 7.

Also, in the above embodiment, $O_2$ sensors are used for air-fuel ratio sensors, but other types of sensors, such as lean mixture sensors or CO sensors, also can be used as the air-fuel ratio sensors in the present invention. If a $T_iO_2$ sensor is used for the upstream air-fuel ratio sensor, the control response of the system is largely improved, whereby over compensation by the downstream air-fuel ratio sensor can be effectively prevented.

Further, in the above embodiment, a microcomputer, i.e., a digital circuit, is used for the control circuit, but an analog circuit can be used equally well for the control circuit of the present invention.

We claim:

1. A device for determining a deterioration of a three-way catalyst disposed in an exhaust passage of an internal combustion engine, said engine comprising an upstream air-fuel ratio sensor disposed in the exhaust passage upstream of said three-way catalyst for generating an output signal corresponding to an air-fuel ratio of the exhaust gas upstream of said three-way catalyst, a downstream air-fuel ratio sensor disposed in the exhaust passage downstream of said three-way catalyst for generating an output signal corresponding to an air-fuel ratio of the exhaust gas downstream of said three-way catalyst, and a feedback control means for controlling the air-fuel ratio of the engine by feedback control, said device comprising:

a signal condition detecting means for detecting the condition that the output signal of said downstream air-fuel ratio sensor is being maintained at either a rich side air-fuel ratio or a lean side air-fuel ratio compared with a stoichiometric air-fuel ratio for more than a predetermined time during the feedback control of the engine by said feedback control means;

a means for calculating an area surrounded by the output signal response curve of said downstream air-fuel ratio sensor and a predetermined reference value line; and a determining means for determining whether or not said three-way catalyst has deteriorated in accordance with said area when said signal condition detecting means detects that the output signal of said downstream air-fuel ratio sensor is being maintained at either said rich side or said lean side air-fuel ratio for more than said predetermined time.

2. A device according to claim 1, wherein said predetermined reference value, based on which said area of the output signal response curve of said downstream air-fuel ratio sensor is calculated, is a minimum value of the output signal of said downstream air-fuel ratio sensor during each oscillation cycle thereof and said determining means determines that said three-way catalyst has deteriorated when said area is more than a predetermined value.

3. A device according to claim 1, wherein said predetermined reference value, based on which said area of the output signal response curve of said downstream air-fuel ratio sensor is calculated, is a predetermined constant value.

4. A device according to claim 1, wherein said predetermined reference value, based on which said area of the output signal response curve of said downstream air-fuel ratio sensor is calculated, is a predetermined constant value, and said determining means determines that said three-way catalyst has deteriorated when said area is larger than a predetermined first value and smaller than a predetermined second value.

5. A device according to claim 1, further comprising:

a means for calculating an area surrounded by the output signal response curve of said upstream air-fuel ratio sensor and a predetermined reference value line and a means for calculating a ratio of said area of the downstream air-fuel ratio sensor and said area of the upstream air-fuel ratio sensor, said determining means also determining whether or not said three-way catalyst is deteriorated in accordance with said ratio of the areas when said signal condition detecting means detects that the output signal of said downstream air-fuel ratio sensor is being maintained at either said rich side or said lean side air-fuel ratio for more than said predetermined time.

6. A device according to claim 5, wherein said predetermined reference value, based on which said area of the output signal response curve of said downstream air-fuel ratio sensor is calculated, is a minimum value of the output signal of said downstream air-fuel ratio sensor during each oscillation cycle thereof, and said predetermined reference value, based on which said area of the output signal response curve of said upstream air-fuel ratio sensor is calculated, is a minimum value of the output signal of said upstream air-fuel ratio sensor during each oscillation cycle thereof, and wherein said determining means determines that said three-way catalyst has deteriorated when said ratio of the areas is larger than a predetermined value.

7. A device according to claim 5, wherein said predetermined reference values, based on which said areas of the output signal response curves of said downstream and upstream air-fuel ratio sensors are calculated, are predetermined constant values.

8. A device according to claim 5, wherein said predetermined reference values, based on which said areas of the output signal response curves of said downstream and upstream air-fuel ratio sensors are calculated, are predetermined constant values, and said determining means determines that said three-way catalyst has deteriorated when said ratio of the areas is larger than a predetermined first value and smaller than a predetermined second value.

9. A device for determining a deterioration of a three-way catalyst disposed in an exhaust passage of an internal combustion engine, said engine comprising an upstream air-fuel ratio sensor disposed in the exhaust passage upstream of said three-way catalyst for generating an output signal corresponding to an air-fuel ratio of the exhaust gas upstream of said three-way catalyst, a downstream air-fuel ratio sensor disposed in the exhaust passage downstream of said three-way catalyst for generating an output signal corresponding to an air-fuel ratio of the exhaust gas downstream of said three-way catalyst, and a feedback control means for controlling the air-fuel ratio of the gas upstream of said catalyst by feedback control, said device comprising:

a means for calculating an area surrounded by the output signal response curve of said downstream air-fuel ratio sensor and a first predetermined reference value line;

a means for calculating an area surrounded by the output signal response curve of said upstream air-fuel ratio sensor and a second predetermined reference value line;

a means for calculating a ratio of said area of the downstream air-fuel ratio sensor and said area of the upstream air-fuel ratio sensor; and a determining means for determining whether or not said three-way catalyst is deteriorated in accordance with said ratio of the areas.

10. A method for determining a deterioration of a three-way catalyst disposed in an exhaust passage of an internal combustion engine having an upstream air-fuel ratio sensor disposed in the exhaust passage upstream of said three-way catalyst for generating an output signal corresponding to an air-fuel ratio of the exhaust gas upstream of said three-way catalyst, a downstream air-fuel ratio sensor disposed in the exhaust passage downstream of said three-way catalyst for generating an output signal corresponding to an air-fuel ratio of the exhaust gas downstream of said three-way catalyst, and a feedback control means for controlling the air-fuel ratio of the engine by feedback control, said method comprising the steps of:

detecting the condition that the output signal of said downstream air-fuel ratio sensor is being maintained at either a rich side air-fuel ratio or a lean side air-fuel ratio compared with a stoichiometric air-fuel ratio for more than a predetermined time during the feedback control of the engine by the feedback control means;

calculating an area surrounded by the output signal response curve of said downstream air-fuel ratio sensor and a predetermined reference value line; and determining whether or not said three-way catalyst has deteriorated in accordance with said area when the output signal of said downstream air-fuel ratio sensor is being maintained at either said rich side or said lean side air-fuel ratio for more than said predetermined time.

11. A method according to claim 10, wherein said predetermined reference value, based on which said area of the output signal response curve of said downstream air-fuel ratio sensor is calculated, is a minimum value of the output signal of said downstream air-fuel ratio sensor during each oscillation cycle thereof, and said step of determining whether or not said three-way catalyst has deteriorated comprises a step of determining that said catalyst has deteriorated when said area is more than a predetermined value.

12. A method according to claim 10, wherein said predetermined reference value, based on which said area of the output signal response curve of said downstream air-fuel ratio sensor is calculated, is a predetermined constant value.

13. A method according to claim 10, wherein said predetermined reference value, based on which said area of the output signal response curve of said downstream air-fuel ratio sensor is calculated, is a predetermined constant value, and said step of determining whether or not said three-way catalyst has deteriorated comprises a step of determining that said catalyst has deteriorated when said area is larger than a predetermined first value and smaller than a predetermined second value.

14. A method according to claim 10, further comprising the steps of:
calculating an area surrounded by the output signal response curve of said upstream air-fuel ratio sensor and a predetermined reference value line and
calculating a ratio of said area of the downstream air-fuel ratio sensor and said area of the upstream air-fuel ratio sensor and
said step of determining whether or not said three-way catalyst has deteriorated comprises a step of also determining the deterioration of said catalyst in accordance with said ratio of the areas when the output signal of said downstream air-fuel ratio sensor is being maintained at either said rich side or said lean side air-fuel ratio for more than said predetermined time.

15. A method according to claim 14, wherein said predetermined reference value, based on which said area of the output signal response curve of said downstream air-fuel ratio sensor is calculated, is a minimum value of the output signal of said downstream air-fuel ratio sensor during each oscillation cycle thereof; said predetermined reference value, based on which said area of the output signal response curve of said downstream air-fuel ratio sensor is calculated, is a minimum value of the output signal of said upstream air-fuel ratio sensor during each oscillation cycle thereof; and said step of determining whether or not said three-way catalyst has deteriorated comprises a step of determining that said catalyst has deteriorated when said ratio of the areas is larger than a predetermined value.

16. A method according to claim 14, wherein said predetermined reference values, based on which said areas of the output signal response curve of said downstream and upstream air-fuel ratio sensors are calculated, are predetermined constant values.

17. A method according to claim 14, wherein said predetermined reference values, based on which said areas of the output signal response curve of said downstream and upstream air-fuel ratio sensors are calculated, are predetermined constant values, and said step of determining whether or not said three-way catalyst has deteriorated comprises a step of determining that said catalyst has deteriorated when said ratio of the areas is larger than a predetermined first value and smaller than a predetermined second value.

18. A method for determining a deterioration of a three-way catalyst disposed in an exhaust passage of an internal combustion engine having an upstream air-fuel ratio sensor disposed in the exhaust passage upstream of said three-way catalyst for generating an output signal corresponding to an air-fuel ratio of the exhaust gas upstream of said three-way catalyst, a downstream air-fuel ratio sensor disposed in the exhaust passage downstream of said three-way catalyst for generating an output signal corresponding to an air-fuel ratio of the exhaust gas downstream of said three-way catalyst, and a feedback control means for controlling the air-fuel ratio of the gas upstream of said catalyst by feedback control, said method comprising the steps of:
calculating an area surrounded by the output signal response curve of said downstream air-fuel ratio sensor and a first predetermined reference value line;
calculating an area surrounded by the output signal response curve of said upstream air-fuel ratio sensor and a second predetermined reference value line;
calculating a ratio of said area of the downstream air-fuel ratio sensor and said area of the upstream air-fuel ratio sensor; and
determining whether or not said three-way catalyst has deteriorated in accordance with said ratio of the areas.

* * * * *